(12) United States Patent
Nyman et al.

(10) Patent No.: US 8,858,799 B2
(45) Date of Patent: Oct. 14, 2014

(54) METHOD AND ARRANGEMENT FOR SEPARATING TWO SOLUTIONS MIXED IN DISPERSION INTO TWO SOLUTION PHASES IN A LIQUID-LIQUID EXTRACTION SEPARATION CELL

(75) Inventors: Bror Nyman, Vanha-Ulvila (FI); Eero Ekman, Pori (FI); Pertti Pekkala, Espoo (FI); Hannu Laitala, Espoo (FI); Rami Saario, Espoo (FI)

(73) Assignee: Outotec Oyj, Espoo (FI)

( * ) Notice: Subject to any disclaimer, the term of this patent is extended or adjusted under 35 U.S.C. 154(b) by 366 days.

(21) Appl. No.: 13/148,373

(22) PCT Filed: Feb. 8, 2010

(86) PCT No.: PCT/FI2010/050081
§ 371 (c)(1),
(2), (4) Date: Aug. 8, 2011

(87) PCT Pub. No.: WO2010/089462
PCT Pub. Date: Aug. 12, 2010

(65) Prior Publication Data
US 2011/0303619 A1    Dec. 15, 2011

(30) Foreign Application Priority Data
Feb. 9, 2009    (FI) .................................... 20095121

(51) Int. Cl.
*B01D 11/04* (2006.01)
*B01D 17/028* (2006.01)
(Continued)

(52) U.S. Cl.
CPC ........ *B01D 11/0453* (2013.01); *B01D 11/0449* (2013.01); *B01D 2011/005* (2013.01); *B01D 17/0211* (2013.01); *C22B 3/005* (2013.01); *C22B 3/02* (2013.01)
USPC ........ 210/643; 210/801; 210/521; 210/532.1; 210/538

(58) Field of Classification Search
None
See application file for complete search history.

(56) References Cited

U.S. PATENT DOCUMENTS

| 4,123,365 A | 10/1978 | Middelbeek |
|---|---|---|
| 4,132,651 A | 1/1979 | Dejong |

(Continued)

FOREIGN PATENT DOCUMENTS

| EP | 1364694 | 11/2003 |
|---|---|---|
| WO | 94/04464 | 3/1994 |

(Continued)

OTHER PUBLICATIONS

Office Action from the State Intellectual Property Office of the People's Republic of China for Application No. 201080005304.7 dated Jun. 5, 2013 (English Translation and Original, 9 pages).
(Continued)

*Primary Examiner* — Katherine Zalasky
(74) *Attorney, Agent, or Firm* — Michael Best & Friedrich LLP

(57) ABSTRACT

The invention relates to a method and arrangement for separating two solutions mixed in dispersion into two solution phases in a liquid-liquid extraction separation cell. The arrangement includes a first guide wall extending along the whole width of the cell with respect to the vertical direction at an inclined angle. The first guide wall includes a bottom edge, which is located at a distance from the cell bottom, so that a clearance gap is formed between the bottom edge and the cell bottom. The arrangement also includes a second guide wall essentially parallel with the first guide wall and placed at a distance therefrom. Between the first guide wall and the second guide wall an uptake shaft is formed extending diagonally upwards at the inclined angle. The second guide wall is pressed tightly against the cell bottom, and includes a number of vertical slots.

4 Claims, 5 Drawing Sheets

Figure 3:
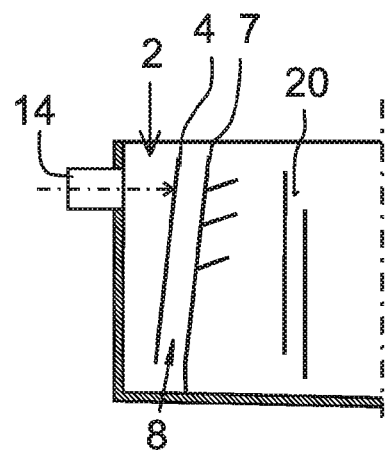

(51) Int. Cl.
*B01D 17/032* (2006.01)
*B01D 17/02* (2006.01)
*C22B 3/38* (2006.01)
*C22B 3/02* (2006.01)
*C02F 1/26* (2006.01)
*B01D 11/00* (2006.01)

(56) References Cited

U.S. PATENT DOCUMENTS

| | | | |
|---|---|---|---|
| 4,971,692 | A | 11/1990 | Sklokin et al. |
| 6,176,608 | B1 | 1/2001 | Nyman et al. |
| 7,390,420 | B2 | 6/2008 | Nyman et al. |
| 7,465,402 | B2 | 12/2008 | Nyman et al. |
| 7,517,461 | B2 | 4/2009 | Nyman et al. |
| 2005/0040106 | A1 | 2/2005 | Gigas et al. |
| 2005/0224410 | A1* | 10/2005 | Nyman et al. ............ 210/634 |
| 2007/0029254 | A1 | 2/2007 | Nyman et al. |

FOREIGN PATENT DOCUMENTS

| | | |
|---|---|---|
| WO | 97/40899 A1 | 11/1997 |
| WO | 03/097207 | 11/2003 |
| WO | 2004/082798 | 9/2004 |

OTHER PUBLICATIONS

PCT/FI2010/050081 International Search Report.

\* cited by examiner

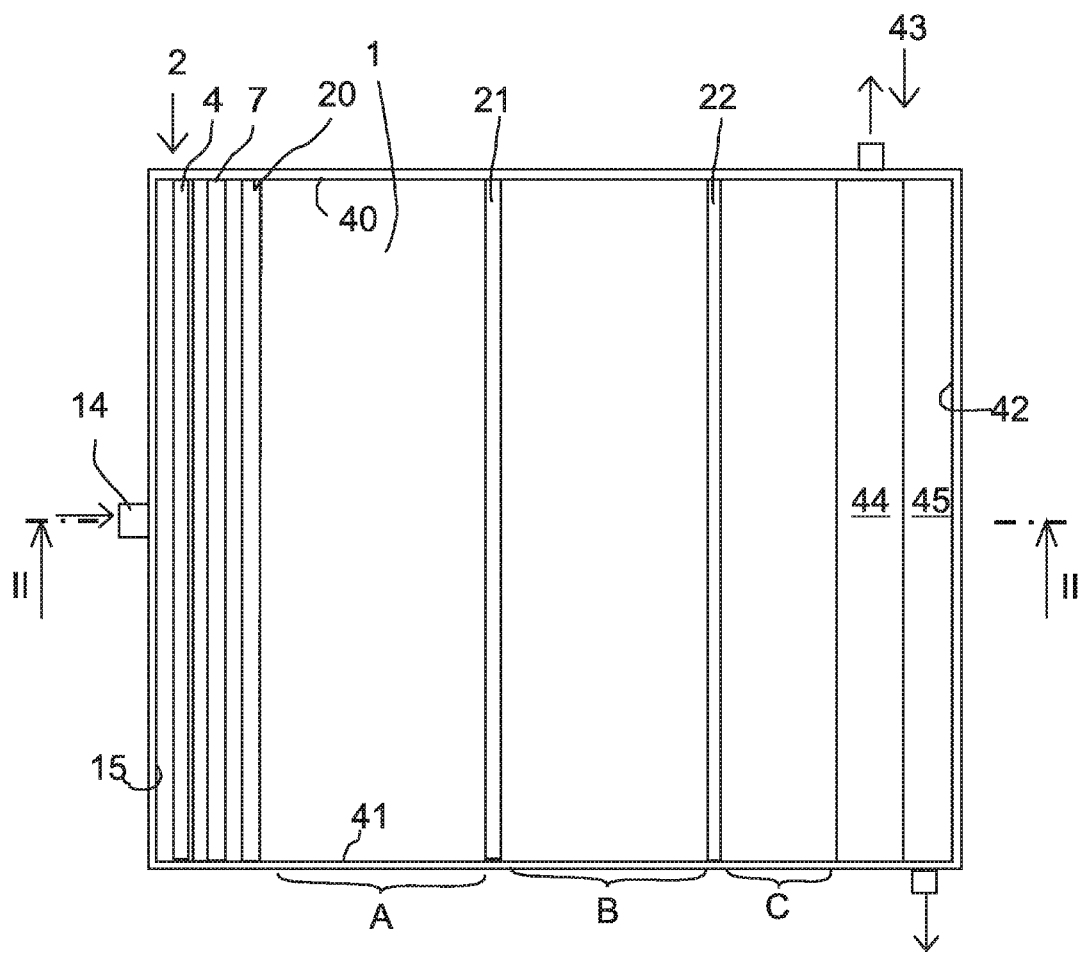
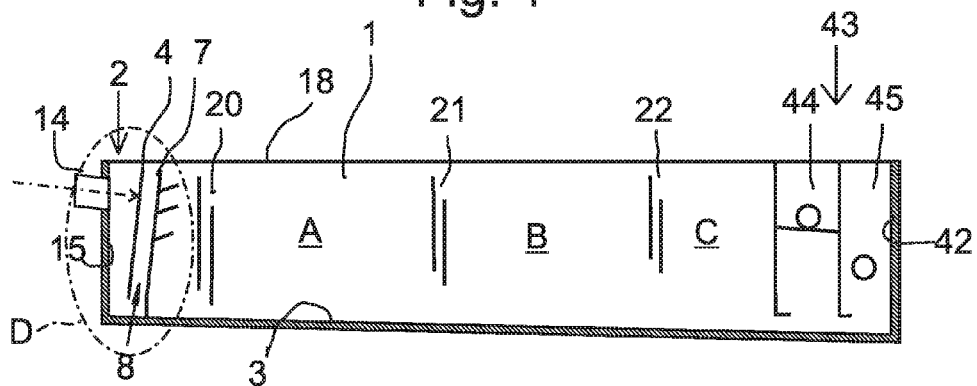

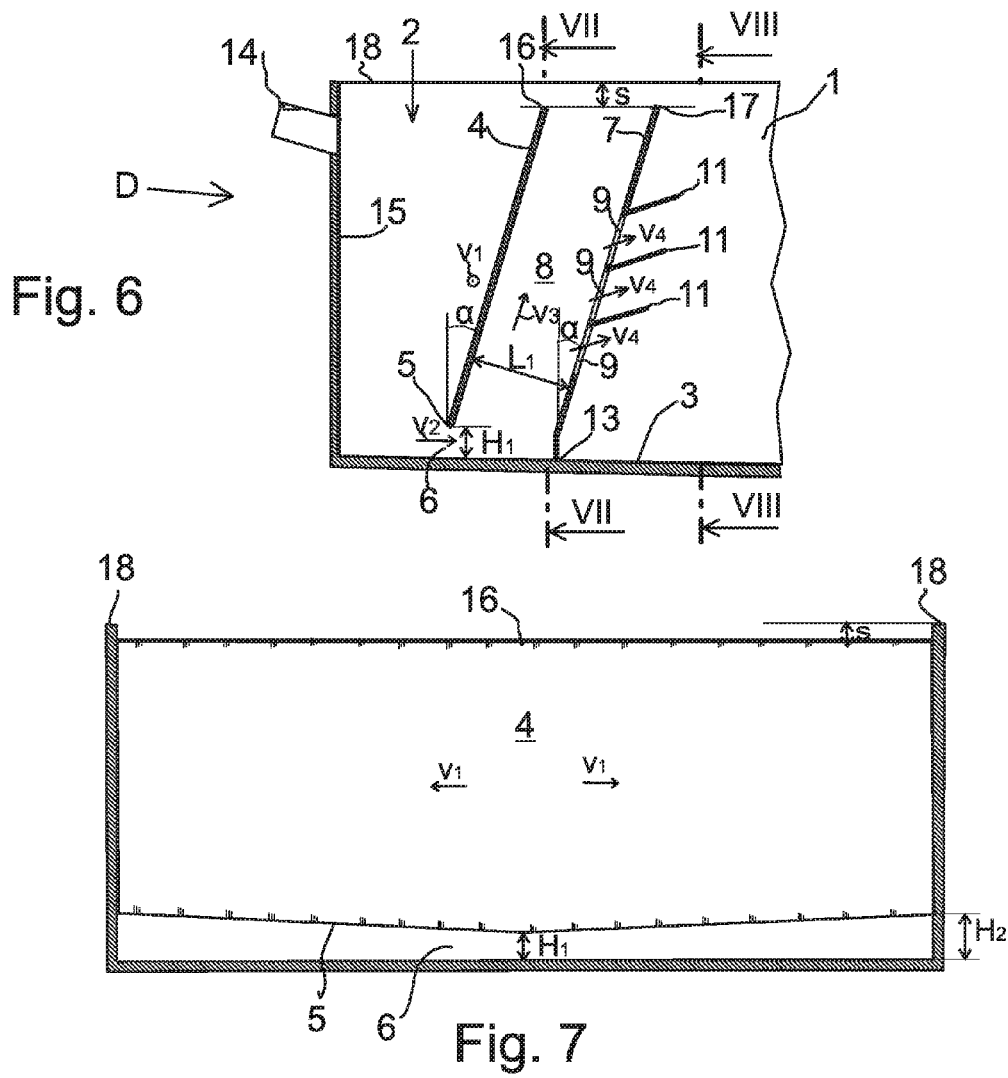
Fig. 6
Fig. 7
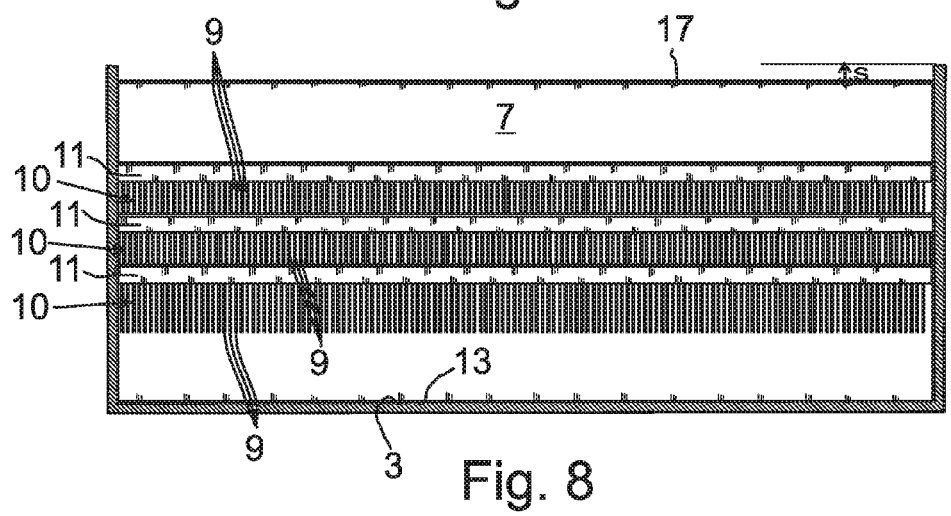
Fig. 8

METHOD AND ARRANGEMENT FOR SEPARATING TWO SOLUTIONS MIXED IN DISPERSION INTO TWO SOLUTION PHASES IN A LIQUID-LIQUID EXTRACTION SEPARATION CELL

CROSS-REFERENCE TO RELATED APPLICATIONS

This patent application is a national stage filing under 35 U.S.C. 371 of International Application No. PCT/FI2010/050081, filed 8 Feb. 2010, which claims foreign priority to Finland Patent Application No. 20095121, filed 9 Feb. 2009, the disclosures of which are incorporated by reference herein in their entireties. Priority to each application is hereby claimed.

FIELD OF INVENTION

The invention relates to a method defined in the preamble of claim 1.

BACKGROUND OF INVENTION

In the prior art, there is known, for example from the patent publications FI101200 B, FI 101199 B, FI 112039B, FI 112328 B and FI 113244 B, various methods and arrangements for separating two solutions mixed in dispersion into two solution phases in a liquid-liquid extraction separation cell. A first solution and a second solution, which is heavier than the first solution, can be separated from the dispersion of said solutions. Generally the cell arrangement includes side walls and a bottom, inside which there is defined a separation space. The cell has a feed end, through which the dispersion is fed into the cell, and a drain end, through which the first and the second solutions are arranged to be drained as mutually separated. In between the feed and drain ends, the cell is provided with separator elements, forming successive separation steps therebetween, where the lighter first solution (generally an organic phase) is separated into an upper solution phase, and the second solution is separated below the upper solution phase into a lower solution phase (generally an aqueous solution). The cell drain end is provided with an overflow chute, which is positioned transversally with respect to the flowing direction, and receives the first solution separated into the upper phase as overflow from the cell, from which overflow chute the solution is drained. In the flowing direction, in succession to the overflow chute and adjacently with it, there is provided a collecting chute for receiving the second solution as underflow from the cell. Riser pipes extend from the collecting chute to the cell, through which riser pipes the second solution can rise to the collecting chute, from which the second solution phase is drained.

OBJECT OF INVENTION

An object of the invention is to further improve known methods and arrangements and to make them more effective, so that the separation quantity per unit of area of two solutions mixed in a dispersion is increased and the separation process is speeded up, the separation rate is increased when measured as a decrease in residual droplets in both separated solutions, and the mass transfer reactions in the separating solution phases achieve a state near their equilibrium.

A further object of the invention is to introduce a method and arrangement that allow a freely chosen incoming direction for the supplied dispersion at the feed end.

Yet an object of the invention is to introduce a method and arrangement by which the solution phase separated on the cell bottom is prevented from flowing back towards the mixer equipment creating the dispersion.

Moreover, an object of the invention is to introduce a method and arrangement that enable the creation of a continued delay at the feed end owing to mixer spaces that become too small.

SUMMARY OF INVENTION

The method according to the invention is characterized by what is set forth in claim 1. The arrangement according to the invention is characterized by what is set forth in claim 11.

According to the invention, in the method the supplied dispersion is at the cell feed end divided into two sideways proceeding flows for distributing the dispersion along the whole width of the cell. The dispersion that is distributed along the whole width of the cell is prevented from proceeding directly in the lengthwise direction of the cell, and the dispersion is allowed to proceed in the lengthwise direction of the cell only in the vicinity of the cell bottom. The dispersion flow that is forced on the cell bottom is conducted to rise diagonally upwards from the vicinity of the cell bottom at an angle that is inclined in the proceeding direction with respect to the vertical direction, and during the rise, the dispersion is compressed to a predetermined degree of compression. The dispersion that has during the rise been compressed to a predetermined degree of compression is divided into a number of adjacent sub-flows that are arranged along the width of the cell in one or several lines and proceed essentially in the lengthwise direction of the cell. The vertical components of the sub-flows are attenuated, and the sub-flows are conducted essentially in the lengthwise direction of the cell to a separating part proper, where the solutions are separated from the dispersion step by step into two successive solution phases. At the same time, the solution phase separated on the cell bottom is prevented from flowing back towards the feed end.

According to the invention, the arrangement includes a first guide wall, which is arranged at a distance from that end wall of the cell that is located on the feed end side, to extend along the whole width of the cell, at an inclined angle with respect to the vertical direction. The first guide wall includes a bottom edge, which is arranged at a distance from the cell bottom, so that in between the bottom edge and the cell bottom, there is left a clearance gap that is widening from the center towards the cell sides. The second guide wall is essentially parallel with the first guide wall, and located at a distance from it, so that in between the first guide wall and the second guide wall, there is formed an uptake shaft proceeding diagonally upwards at an inclined angle. The second guide wall includes a bottom edge, which is pressed tightly against the cell bottom, a number vertical slots that are arranged as a horizontal line of vertical slots, said line extending, along the width of the second guide wall, at a distance from the bottom edge, and a slanting plate, which is attached to the second guide wall, in the vicinity of the top part of the line of vertical slots.

The basic idea of the invention is to achieve the objects thereof by using strong dispersion layers with a controlled flow, created by a method and arrangement according to the invention, by implementing a feed end of the separation space, which feed end is nearly filled with the dispersion, and where the dispersion that is compressing and separating in droplets flows both in the sideways and vertical directions, in order to bring the mass transfer reactions that have started in the mixer space near their equilibrium.

In an embodiment of the method, the dispersion is fed into the cell at the center of the feed end or in the vicinity of the center.

In an embodiment of the method, the dispersion is fed into the cell in an orientation that is directed either horizontally, vertically downwards from the top, diagonally downwards with respect to the horizontal direction and/or diagonally upwards with respect to the horizontal direction. The invention can be an alternative for our invention introduced in the publication FI 101200 B, where the feeding of the dispersion at the feed end is carried out as directed upwards at a low-gradient angle, but it can also represent a recommendable solution in certain cases. For example, when performed in a wrong way, the feeding of dispersion may reinforce the ubottom current in the separation space, with the result that a harmful quantity of residual droplets from the other solution phase is left in the aqueous solution drained from the separation space. According to the method described in the publication FI 101200 B, the dispersion conducted in the separation space is directed upwards in order to prevent any strengthening of the bottom current in the separation space. According to the present invention, the separation space itself guides the dispersion conducted at the feed end thereof upwardly, in which case the incoming direction and inlet point of the dispersion in the vertical direction can be freely chosen. The inlet flow can even be pointed directly downwards in the middle of the feed end of the separation space, although this orientation is often directed diagonally downwards. Let us point out that the feed end of the separation space according to the present invention is also perfectly capable of receiving an upwardly rising dispersion flow, such as the uptake shaft flow described in the publication FI 101200 B. The invention allows a freely chosen incoming direction and level for the dispersion supply. In particular, the method and arrangement according to the invention are feasible in old extraction plants that are being renovated and where the dispersion supply at the feed end is directed downwardly or horizontally.

In an embodiment of the method, the supplied dispersion is at the cell feed end divided into sideways proceeding flows by means of a first guide wall positioned at an inclined angle with respect to the vertical direction; in between the bottom edge of said first guide wall and the cell bottom, there is left a clearance gap that is widened from the center towards the cell sides, and via said clearance gap, the dispersion is forced to proceed to the vicinity of the cell bottom.

In an embodiment of the method, the dispersion flow proceeding via the clearance gap is guided by a second guide wall in the vicinity of the cell bottom to rise diagonally upwards at an inclined angle. The second guide wall is essentially parallel with the first guide wall and positioned at a distance therefrom, so that in between the first guide wall and the second guide wall, there is formed an uptake shaft extending diagonally upwards at an inclined angle, and in said uptake shaft, the dispersion rises upwardly and is compressed.

In an embodiment of the method, the compressing dispersion rising along the uptake shaft is divided into a number of sub-flows essentially proceeding in the lengthwise direction of the cell by means of a number of vertical slots provided in a second guide wall, said vertical slots being arranged in a horizontal line of vertical slots along the width of the second guide wall, at a distance from the bottom edge of the second guide wall, so that the dispersion obtains a predetermined degree of compression after reaching the line of vertical slots.

In an embodiment of the method, the vertical component of the sub-flows discharged through the vertical slots is attenuated, and the sub-flows are guided to proceed essentially in the lengthwise direction of the cell by means of a slanting plate, which is attached to the second guide wall, in the vicinity of the top part of the line of vertical slots.

In an embodiment of the method, the flow of the dispersion is equalized by several superimposed and slanting plates, which are positioned in parallel and arranged in the vicinity of each other, at the line of vertical slots.

In an embodiment of the method, the second guide wall includes two or several superimposed lines of vertical slots.

In an embodiment of the method, the solution phase separated on the cell bottom from the sub-flows is prevented from flowing back to the feed end by arranging the bottom edge of the second guide wall tightly against the cell bottom.

In an embodiment of the arrangement, the second guide wall includes two or several superimposed lines of vertical slots.

In an embodiment of the arrangement, the second guide wall is a provided with a number of parallel, superimposed and adjacently arranged slanting plates, which are placed at the line of vertical slots.

In an embodiment of the arrangement, the cross-sectional area of the space left between the end wall on the cell feed end side and the first guide wall is chosen so that the lateral flow rate of the dispersion is within the range 0.1 . . . 0.6 m/s.

In an embodiment of the arrangement, the height of the clearance gap is chosen so that the dispersion flow rate $v_2$ via the clearance gap to the uptake shaft is 0.2 . . . 0.4 m/s.

In an embodiment of the arrangement, the height of the clearance gap in the center region is 50 . . . 200 mm and on the sides the height of the clearance gap is 100 . . . 300 mm, as the height grows evenly from the center towards the sides.

In an embodiment of the arrangement, the first guide wall and the second guide wall are inclined with respect to the vertical direction at an angle of inclination, which is 5° . . . 20°.

In an embodiment of the arrangement, the top edge of the first guide wall and the top edge of the second guide wall extend so high up that the dispersion has no access to flow over them.

In an embodiment of the arrangement, the top edges of the first guide wall and the second guide wall are placed at a distance of 50 . . . 100 mm below the horizontal plane defined by the side edge of the cell.

In an embodiment of the arrangement, the width of the uptake shaft is chosen so that the rising flow rate of the dispersion compressing in the uptake shaft is 0.05 . . . 0.10 m/s.

In an embodiment of the arrangement, the total slot area of the lines of vertical slots is chosen so that the outflowing rate of the dispersion sub-flows discharged through the vertical slots is 0.15 . . . 0.30 m/s.

In an embodiment of the arrangement, the slanting plates are arranged as a pack of sliced sheets, where in between the slanting plates, there are formed narrow laminar flow canals, by which the outflowing rate of the dispersion sub-flows discharged through the vertical slots via the pack of sliced sheets can be slowed down to the region 0.05 . . . 0.1 m/s.

LIST OF DRAWINGS

Figure 4:
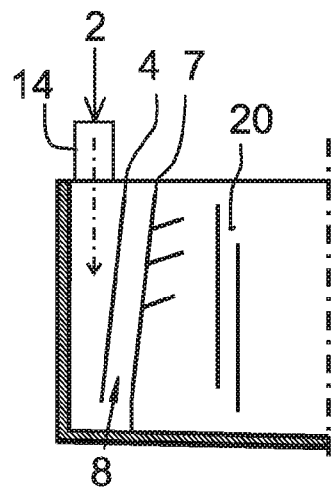
Figure 5:
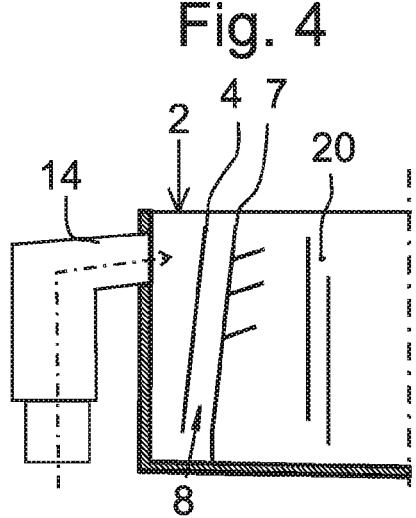
Figure 9:
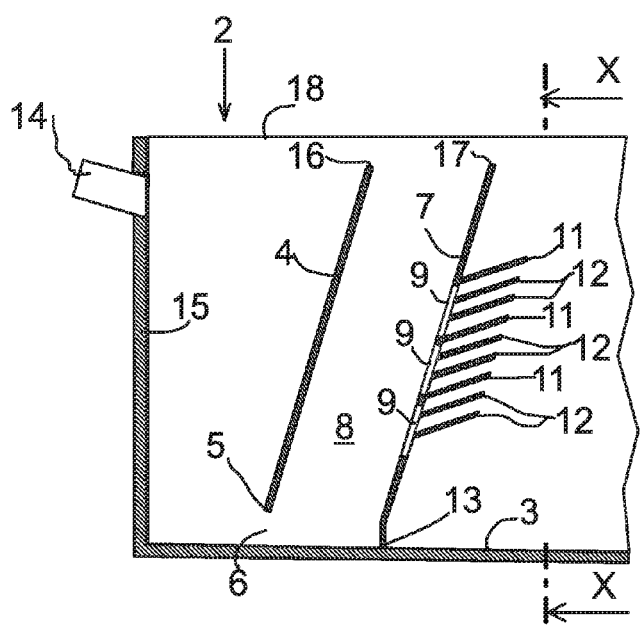
Figure 10:
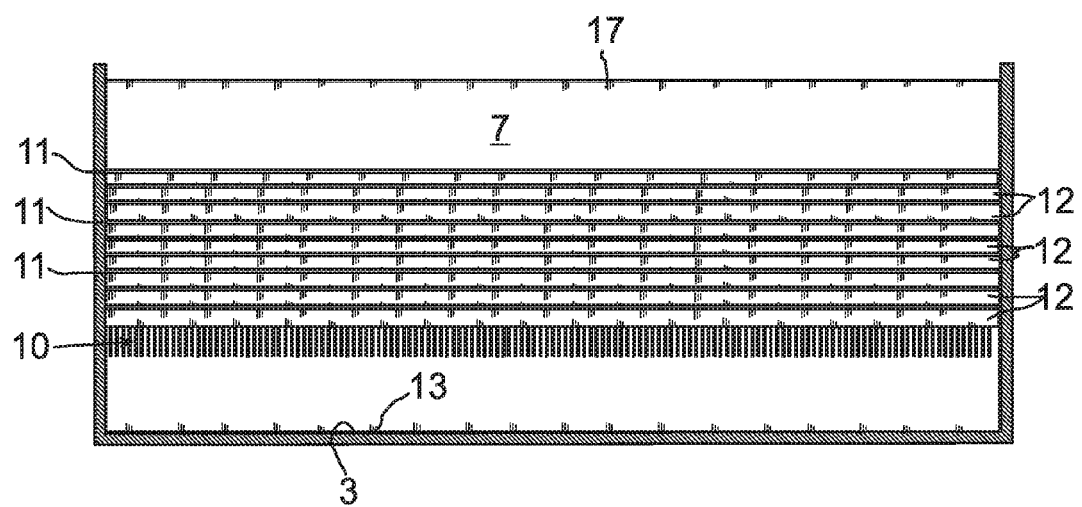
Figure 11:
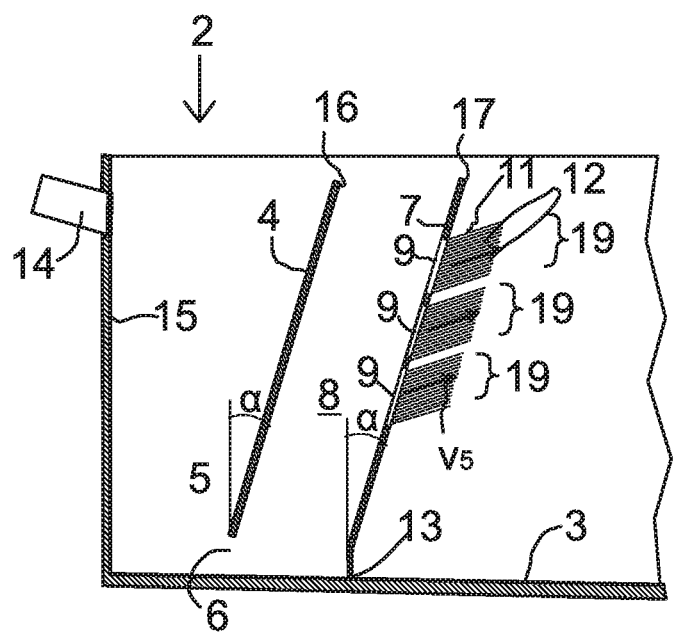

The invention is explained in more detail below, with reference to preferred embodiments and to the appended drawing, where FIG. 1 is a schematical top-view illustration of a liquid-liquid extraction separation cell provided with an arrangement according to the invention, FIG. 2 illustrates the section II-II in FIG. 1, FIG. 3 illustrates a first embodiment of the cell feed end, to which the feeder device feeds the dispersion in the horizontal direction, FIG. 4 illustrates a second embodiment of the cell feed end, to which the feeder device feeds the dispersion in the vertical direction downwards from the top, FIG. 5 illustrates a third embodiment of the cell feed end, to which the feeder device feeds the dispersion diagonally upwards with respect to the horizontal direction, FIG. 6 illustrates a detail D of FIG. 2, shown as enlarged, FIG. 7 illustrates the section VII-VII of FIG. 6, FIG. 8 illustrates the section VIII-VIII of FIG. 6, FIG. 9 illustrates an alternative embodiment for the gap wall illustrated in FIG. 6, FIG. 10 illustrates the section X-X of FIG. 9, and FIG. 11 illustrates an alternative embodiment for the gap wall illustrated in FIG. 6.

DETAILED DESCRIPTION OF INVENTION

FIGS. 1 and 2 illustrate a cell arrangement in liquid-liquid extraction. The cell 1 includes an end wall 15 at the cell feed end 2, side walls 40, 41, an end wall 42 at the drain end and a bottom 3, which define between them the separation space (so-called settler).

A dispersion prepared in the mixing space (not illustrated) is fed from the feeder device 14 to the feed end 2 of the cell 1. The first and second solutions separated in successive phases are arranged to be removed, as mutually separated, at the drain end 43 of the cell 1 that is positioned opposite to the feed end 2. Shut-off elements 20. 21, 22 are arranged in the cell between the feed end and the drain end to provide successive separation steps A, B, C in the flowing direction in order to separate the lighter first solution into an upper solution phase, and to separate the heavier second solution into a lower solution phase. The drain end 43 is provided with an overflow chute 44, which is placed transversally with respect to the flowing direction and receives the first solution, separated into the upper phase, as overflow from the cell 1, through which overflow chute 44 the solution phase is drained. In succession to the overflow chute 44 in the flowing direction and adjacently therewith, there is provided a collecting chute 45 for receiving the second solution as underflow from the cell 1. Riser pipes are arranged to extend from the collecting chute 45 to the cell, through which riser pipes the second solution can rise to the collecting chute, from which the second solution phase is removed.

From FIG. 1 it is seen that the feeder device 14 is arranged so that the dispersion is fed into the cell 1 preferably at the center of the feed end or in the vicinity thereof. The location of the dispersion feed point at the center of the feed end or in the vicinity of the center is advantageous but not absolutely necessary.

In the example of FIG. 2, the dispersion is fed into the cell 1 with a diagonally downwardly orientation with respect to the horizontal direction, at right angles to the first guide wall 4. FIGS. 3-5 illustrate other possible alternatives for the feeding direction of the dispersion. In FIG. 3, the feeder device 14 is arranged to feed the dispersion in the cell 1 in a horizontal direction. In FIG. 4, the feeder device 14 is arranged to feed the dispersion to the cell 1 vertically downwards from the top. In the example of FIG. 5, the feeder device 14 is arranged to feed the dispersion to the cell 1 diagonally upwards with respect to the horizontal direction.

FIG. 6 illustrates a detail D of FIG. 2, shown as enlarged. In FIG. 6 it is seen that the arrangement includes a first guide wall 4, which is arranged at a distance from the end wall 15 of the cell 1 that is located on the side of the feed end 2 thereof. As is likewise seen in FIG. 7, the first guide wall 4 extends along the whole width of the cell 1. Further, from FIG. 6 it is seen that the first guide wall is placed at an inclined angle $\alpha$ with respect to the vertical direction. The first guide wall 4 includes a bottom edge 5, which is located at the distance $H_1 \ldots H_2$ from the cell bottom, so that in between the bottom edge 5 and the cell bottom 3, there is left a clearance gap 6 that is widening from the center towards the cell sides. The first guide wall 4 is completely closed.

Further, with reference to FIGS. 6 and 8, the second guide wall 7 is essentially parallel with the first guide wall 4, i.e. placed at the same inclined angle $\alpha$ with respect to the vertical direction as the first guide wall 4. The second guide wall 7 extends along the whole width of the cell 1. The second guide wall 7 is located at a perpendicular distance $L_1$ from the first guide wall 4, so that in between the first guide wall 4 and the second guide wall 7, there is formed said diagonally upwards extending uptake shaft 8 having an inclined angle $\alpha$. The angle $\alpha$ is preferably $5° \ldots 20°$.

The second guide wall 7 includes a bottom edge 13, which is pressed tightly against the cell bottom 3. The second guide wall 7 comprises a number of vertical slots 9, which in a way illustrated in FIG. 8 are arranged as horizontal lines 10 of vertical slots, which extend along the width of the second guide wall 7, at a distance from the bottom edge 13 of the second guide wall 7. In the example of FIG. 8, the number of the lines of vertical slots is three. In the vicinity of the top part of each line of vertical slots 10, there is attached a slanting plate 11 to the second guide wall 7.

When feeding dispersion to the feed end 2, the process is as follows. When feeding the dispersion at right angles to the first guide wall 4, it is made to be divided into two sideways proceeding flows, so that the dispersion flow is distributed along the whole width of the cell. The cross-sectional area of the space left between the end wall 15 and the first guide wall 4 is chosen so that the lateral flow rate $v_1$ of the dispersion is within the range $0.1 \ldots 0.6$ m/s. The flow is so high that any significant liquid-liquid separation does not take place in the flowing dispersion, owing to the turbulence prevailing therein. Now the SX-mass transfer reactions (SX, solvent extraction) started in the mixing spaces can be brought even nearer to their equilibrium, which can be inadequate when treating large are variable solution flows. The installation of a guide wall arrangement 4, 7 at the feed end is also possible when renovating old plants for larger solution flows.

The height $H_1$ of the clearance gap 6 at the center of the first guide wall is preferably $50 \ldots 200$ mm, and on the sides the height of the clearance gap $H_2$ is $100 \ldots 300$ mm, as the height grows evenly from the center towards the sides. The heights $H_1$, $H_2$ are chosen so that the dispersion flow rate $v_2$ at the U-turn through the clearance gap 6 to the uptake shaft 8 is $0.2 \ldots 0.4$ m/s.

The top edge 16 of the first guide wall 4 and the top edge 17 of the second guide wall 7 extend so high, that the dispersion has no access to flow over them. The top edges 16, 17 of the first guide wall 4 and the second guide wall 7 are located at a distance s, which is placed $50 \ldots 100$ mm below the horizontal plane defined by the side edge 18 of the cell. The dispersion has access to proceed to the uptake shaft 8 only through the clearance gap 6 left between the bottom edge 5 of the first guide wall 4 and the bottom.

In the uptake shaft 8, the dispersion flow rises at an angle $\alpha$ upwards and is compressed during the rise. The width $L_1$ of the uptake shaft 8 is chosen so that the dispersion, which is already partly compressed in droplet grouping, remains compressed. The rising flow rate $v_3$ of the dispersion that is compressed in the uptake shaft 8 is 0.05 . . . 0.10 m/s. The compressing dispersion rising along the uptake shaft 8 is divided into a group of sub-flows proceeding essentially in the lengthwise direction of the cell by means of a number of vertical slots 9 provided in the second guide wall 7, said slots being arranged as lines 10 of vertical slots, the number of said lines being preferably 2 . . . 4. After reaching the line of vertical slots 10, the dispersion has a predetermined degree of compression. The total slot area of the lines 10 of vertical slots is chosen so that the outflowing rate $v_4$ of the dispersion sub-flows discharged from the vertical slots 9 is 0.15 . . . 0.30 m/s. Said rate is sufficiently fast to equalize the outflowing of the dispersion over the whole width of the cell. The dispersion flows in the top layer of the separator part, discharged through the vertical slots 9, are made to proceed clearly more vigorously than the flow layers located lower down.

The vertical component of the sub-flows discharged from the vertical slots 9 is attenuated, and the sub-flows are guided to proceed essentially in the lengthwise direction of the cell by means of a slanting plate 11, which is attached to the second guide wall 7, in the vicinity of the top part of the line of vertical slots 9. The slanting plates 11 attenuate the vertical flow of the dispersion and guide it into more uniform sub-flows in the lengthwise direction of the settler. The surface layer of the dispersion is made to proceed faster than the bottom layer, while the speed difference is only slight, i.e. 5 . . . 15 mm/s. The flows are mainly centered in the top part of the settler, which is a way to restrain a harmful strengthening of the bottom current.

A possibly still ongoing mass transfer process proceeds nearer to its equilibrium in the dispersion compressing in the uptake shaft 8, as the dispersion rises and flows in controlled sub-flows out into the first separation space A. The mass transfer reactions can still continue as the dispersion sinks and accumulates against the first shut-off element 20. Thus the guide walls 4 and 7 serve as an extended zone for the mass transfer process, when the SX reactions for one reason or another are not completed in the mixers. Moreover, the second guide wall 7 belonging to the structure of the uptake shaft means a guaranteed prevention of reflux. In addition, said feed end arrangement renders a degree of liberty for the incoming direction of the dispersion, when it enters the settler feed end. The U-turn of the dispersion, and its conduction upwardly in rising flows into the separator part of the settler, in turn successfully equalize the total circulations in said settler.

When the bottom edge 13 of the second guide wall 7 is tightly pressed against the cell bottom 3, the reflux of the solution phase that is separated from the sub-flows on the cell bottom is prevented. The second guide wall 7 closes the bottom part of the separation space in a way that prevents the aqueous solution from flowing towards the free end of the separation space. According to the publication FI 102100 B, a reflux of the aqueous phase is prevented by placing the feed conduit of the separation space so high up that any remarkable reflux cannot be created. Here the feed rate can be freely chosen, and yet a disturbing reflux can be avoided in all operational situations. An aqueous solution, being heavier than an organic extraction solution, can in a shutdown situation or in case of a power failure be accumulated in the dispersion mixers, as well as in their outlet pipework in a way that rises the surface of the separated extraction. The surface can rise to the extent that the extraction solution gets access to leak out of the arrangement, for example via mixer axis through holes etc. critical points. Even if this should not happen, in this case the altered hydraulic equilibrium results in that the relative volume fractions of the solutions in the mixers are changed. This may in turn create a situation where the solution continuity in said mixers becomes disadvantageous in the following start-up. Now a reflux of the solution phase that was separated on the cell bottom towards the feed end is prevented by a second guide wall 7, and therefore the extraction plant can be started up from the same conditions where it was stopped.

FIGS. 9 and 10 illustrate an arrangement corresponding to that of FIG. 6, where the second guide wall 7 is provided with lines 10 of vertical slots 9 and with slanting plates 11 in a similar fashion as the second guide wall 7 in FIG. 6, but with the difference that the outflowing of the dispersion through the vertical slots 9 is equalized by several slanting plates 12 that are in parallel, as superimposed and adjacently arranged, said slanting plates 12 being placed at each line 10 of vertical slots. By increasing the number of the slanting plates 11, 12, the settler flows can be further equalized, and the separation of the dispersion can be speeded up.

FIG. 11 illustrates yet another embodiment of the guide wall 7, where the slanting plates 11, 12 are arranged as a pack of sliced sheets 19, where in between the slanting plates, there are formed narrow laminar flow canals. The separation rates of the dispersion solutions, as well as the mass transfer reaction speeds, can be further increased by using this kind of laminar flow arrangement. The outflowing rate $v_5$ of the dispersion sub-flows through the vertical slots 9 via the pack of sliced sheets 19 can be reduced to the range of 0.05 . . . 0.1 m/s, in order to make both the separation and reaction speeds rise as efficiently as possible.

The dispersion, according to methods described above, is divided as a whole into two lateral sub-flows, these at the same time flow along the cell width, from underneath the first guide wall 4 to the uptake shaft and there steeply upwards, and further as evenly divided sub-flows out into the first separator part A proper of the separation space. The flows entering the separator part A proper are mainly centered in the top part of the separator, in a way that maintains subdued lengthwise cyclic flows in the strong dispersion layer of the separator part A. In this way, the mass transfer proceeds and approaches to the equilibrium of the extraction reactions.

The invention is not restricted to the above described embodiments only, but many modifications are possible within the scope of the inventive idea defined in the claims.

The invention claimed is:

1. A method for separating two solutions mixed in dispersion into two solution phases in a liquid-liquid extraction separation cell (1), in which method the dispersion is fed into the cell at the center of the feed end (2), wherein the supplied dispersion is divided at the feed end (2) of the cell (1) into sideways proceeding flows by means of a first guide wall (4) positioned at an inclined angle ($\alpha$) with respect to the vertical direction, and in between a bottom edge (5) of said wall (4) and the cell bottom (3), there is left a clearance gap (6), which is widened from a center towards sides of the cell, through which clearance gap the dispersion is forced to proceed near to the cell bottom (3), the dispersion distributed along the width of the cell (1) is prevented from proceeding directly in the lengthwise direction of the cell by means of said first guide wall (4), and the dispersion is allowed to proceed in the lengthwise direction of the cell only near to the cell bottom (3) by means of said clearance gap (6), the dispersion flow proceeding through the clearance gap (6) is, by means of a second guide wall (7), conducted to rise from near to the bottom (3) of the cell (1) diagonally upwards at an inclined angle ($\alpha$), said second guide wall (7) being essentially parallel with the first guide wall (4) and located at a distance ($L_1$) therefrom, so that in between the first guide wall (4) and the second guide wall (7), there is created an uptake shaft (8) extending diagonally upwards at an inclined angle ($\alpha$), in which uptake shaft (8) the dispersion rises upwards and is compressed, the dispersion that was compressed to a predetermined degree of compression during the rise is divided into a number of adjacent sub-flows, distributed in one or several lines along the cell width and proceeding essentially in the lengthwise direction of the cell, the compressing dispersion rising in the uptake shaft (8) is divided into said number of sub-flows proceeding essentially in the lengthwise direction of the cell by means of a number of vertical slots (9) provided in the second guide wall (7), said slots (9) being arranged as a horizontal line (10) of vertical slots along the width of the second guide wall, at a distance from a bottom edge of the second guide wall, so that the dispersion, when reaching the line of vertical slots, has a predetermined degree of compression, vertical component of the sub-flows discharged through the vertical slots (9) is attenuated, and the sub-flows are conducted to proceed essentially in the lengthwise direction of the cell by means of a slanting plate (11), which is attached to the second guide wall (7), near to a top port of the line of vertical slots (9), to a separator part, where the solutions are separated from the dispersion step by step into two successive solution phases, and the solution phase separated from the sub-flows on the bottom (3) of the cell (1) is prevented from flowing back to the feed end by arranging the second guide wall (7) so that its bottom edge (13) is pressed tightly against the cell bottom.

2. A method according to claim 1, wherein the dispersion is fed into the cell (1) in a horizontal orientation, vertically downwards from the top, diagonally downwards with respect to the horizontal direction or diagonally upwards with respect to the horizontal direction.

3. A method according to claim 1, wherein the dispersion flow is equalized by means of a plurality of parallel slanting plates (12), which are placed at the line (10) of vertical slots.

4. A method according to claim 1, wherein the second guide wall (7) includes at least two lines (10) of vertical slots.

* * * * *